(12) United States Patent
Blasko et al.

(10) Patent No.: US 11,034,095 B2
(45) Date of Patent: Jun. 15, 2021

(54) WAVEGUIDE SEGMENT FOR PLASTIC WELDING, ARRANGEMENT FOR PLASTIC WELDING, A WELDING METHOD AS WELL AS A MANUFACTURING METHOD OF A WAVEGUIDE SEGMENT

(71) Applicant: BRANSON Ultraschall Niederlassung der Emerson Technologies GmbH & Co. OHG, Dietzenbach (DE)

(72) Inventors: Marian Blasko, Piestany (SK); L'udovít Šipoš, Nové Mesto nad Váhom (SK)

(73) Assignee: BRANSON Ultraschall Niederlassung der Emerson Technologies GmbH & Co. OHG, Dietzenbach (DE)

( * ) Notice: Subject to any disclaimer, the term of this patent is extended or adjusted under 35 U.S.C. 154(b) by 56 days.

(21) Appl. No.: 16/695,849

(22) Filed: Nov. 26, 2019

(65) Prior Publication Data

US 2020/0164595 A1    May 28, 2020

(30) Foreign Application Priority Data

Nov. 27, 2018   (EP) .................................... 18208729

(51) Int. Cl.
    *B29C 65/16*         (2006.01)
(52) U.S. Cl.
    CPC ...... *B29C 65/1687* (2013.01); *B29C 65/1638* (2013.01)
(58) Field of Classification Search
    CPC .................. B29C 65/1687; B29C 65/1638
    See application file for complete search history.

(56) References Cited

U.S. PATENT DOCUMENTS

| 6,528,755 B2 | 3/2003 | Grewell et al. |
| 7,723,640 B2 | 5/2010 | Caldwell et al. |
| 9,757,896 B2 | 9/2017 | Schiccheri et al. |

(Continued)

FOREIGN PATENT DOCUMENTS

| DE | 102004058221 A1 | 6/2005 |
| DE | 112007002109 T5 | 7/2009 |

(Continued)

OTHER PUBLICATIONS

JP Office Action for JP Application No. 2019-211249 dated Oct. 26, 2020 (4 pages).

*Primary Examiner* — Daniel McNally
(74) *Attorney, Agent, or Firm* — Reising Ethington P.C.

(57) ABSTRACT

A waveguide segment with two sub-segments including a first sub-segment with a first wall and a second wall, each having an inner face by which laser light can be reflected. The inner faces are opposite to each other and a depth of the sub-segment is defined by a distance between the first and the second inner face. Further, each wall has an exit side, and an opposite entry side, a height defined by the distance between the exit and the entry side and a width. At least part of the entry side of each wall extends in an angle to the height, for which applies: $0°<\alpha<90°$. The second sub-segment may be formed complementary and the second sub-segment has a portion at the exit side of each wall. Laser light passing through the second sub-segment enters the first sub-segment between the first and the second portion.

16 Claims, 9 Drawing Sheets

(56) References Cited

U.S. PATENT DOCUMENTS

| | | |
|---|---|---|
| 10,065,363 B2 | 9/2018 | Schiccheri et al. |
| 2007/0047932 A1 | 3/2007 | Caldwell et al. |
| 2016/0236403 A1* | 8/2016 | Schiccheri .............. F21S 41/29 |

FOREIGN PATENT DOCUMENTS

| | | |
|---|---|---|
| EP | 2957418 A1 | 12/2015 |
| JP | 2003530240 A | 10/2003 |
| JP | 2016005846 A | 1/2016 |
| JP | 2016021383 A | 2/2016 |

* cited by examiner

WAVEGUIDE SEGMENT FOR PLASTIC WELDING, ARRANGEMENT FOR PLASTIC WELDING, A WELDING METHOD AS WELL AS A MANUFACTURING METHOD OF A WAVEGUIDE SEGMENT

CROSS REFERENCE TO RELATED APPLICATIONS

This application claims the priority of European patent application No. 18208729.6, filed on Nov. 27, 2018. The entire content of this priority application is incorporated herein by reference in its entirety.

TECHNICAL FIELD

The present disclosure is related to a first waveguide sub-segment, a second waveguide sub-segment, a waveguide segment for a negative waveguide for plastic welding, a tool comprising a negative waveguide, an arrangement for plastic welding, a length adjustment method of a waveguide segment, a method for plastic welding as well as a manufacturing method of the waveguide sub-segments.

BACKGROUND

Generally, several types of waveguides for laser light for plastic welding are known. Often, the last element of an arrangement for plastic welding is denoted as waveguide, before the laser light of a laser light source enters the components to be welded. The waveguide has especially the object to homogenize the distribution of the laser light so that the energy of the laser light enters the components to be welded as uniformly as possible and individual focal points are avoided.

At that, it is generally differentiated between two types of waveguides, namely the positive and the negative waveguide. Positive waveguides consist of a solid state which guides laser light in the interior following the law of total internal reflection. An example of such a positive waveguide is described in DE 10 2004 058 221 A1. Negative waveguides have the feature of a channel like cavity, which is coated with a reflective layer and in which the laser light is guided. An example of such a negative waveguide is described in DE 11 2007 002 109 T5. The negative waveguide described has a non-conical longitudinal cross-section producing a non-circular weld zone. Further, negative waveguides having a conical longitudinal cross-section are also known.

With respect to the waveguide as usually last element of a welding arrangement prior to the components to be welded to each other, it is thus desirable that energy losses due to the waveguide are kept as small as possible.

Further, and with respect to plastic welding, usually one specific part is produced with an arrangement for plastic welding, e.g. a light of a vehicle or the like. Based on the information provided by the ordering party, a first company manufactures the tools for producing the two components to be welded to each other, e.g. injection molding tools. A second company manufactures a welding tool including the waveguide or the complete arrangement for welding. Due to deviations in the dimensions which are based on the different manufacturing processes, the tool including the waveguide may not fit exactly to the components produced with the e.g. injection molding tools. Thus, laser light exiting from the waveguide may not exactly radiate the intended welding seam line, resulting in that the components to be welded to each other may not be uniformly welded to each other. Thus, there is also a need for compensating such deviations or tolerances.

It is therefore an object of the present disclosure to provide a waveguide which can be adapted from an actual welding seam line to a desired welding seam line while at the same time the energy losses caused by the waveguide are not increased or even reduced compared to the known waveguides. Further, it is an object of the present disclosure to provide a respective arrangement, a respective length adjustment method, a respective welding method as well as a respective manufacturing method.

SUMMARY

The above object is solved by a first waveguide sub-segment, a second waveguide sub-segment, a waveguide segment, an arrangement for plastic welding and a manufacturing method of a first and/or second waveguide sub-segment. Further embodiments result from the following description, the figures and the appending claims.

A first waveguide sub-segment of a negative waveguide for plastic welding, especially for laser transmission welding, comprises: a first wall having a first inner face by means of which laser light can be reflected, a second wall having a second inner face by means of which laser light can be reflected, wherein the first and the second inner face are arranged opposite to each other and a first depth of the first waveguide sub-segment is defined by a distance between the first and the second inner face, and the first and the second wall comprise an exit side, which faces the components to be welded in operation, and an opposite entry side, wherein a first height of the first wall is defined by a distance between the exit and the entry side of the first wall and a second height of the second wall is defined by a distance between the exit and the entry side of the second wall and a first width of the first wall is defined by an extension of the first wall perpendicular to the first height as well as to the first depth and a second width of the second wall is defined by an extension of the second wall perpendicular to the second height as well as to the first depth, wherein the entry side of the first wall extends at least in a first portion in a first angle $\alpha_1$ with respect to the first height, for which applies: $0°<\alpha_1<90°$, or $5°<\alpha_1<85°$ or $10°<\alpha_1<80°$, and the entry side of the second wall extends at least in a second portion in a second angle $\alpha_1$ with respect to the second height, for which applies: $0°<\alpha_2<90°$, or $5°<\alpha_2<85°$ or $10°<\alpha_2<80°$, wherein during usage of the first waveguide sub-segment, laser light from another waveguide sub-segment enters the first waveguide sub-segment between the first and the second portion.

The terms depth, width and height as used throughout the description and the claims correspond to the Cartesian coordinate system with depth and width defining the x,y-plane while the height defines the z-axis.

The first waveguide sub-segment is described in the following during its usage in an arrangement for plastic welding, especially in an arrangement for laser transmission welding. Laser transmission welding is a one-step process in which the heating of the components to be welded and the joining process take place almost at the same time. For this process, one of the components to be welded must have a high transmittance or transmission degree in the range of the laser wave length and the other must have a high absorptance or absorptivity. Prior to the welding process, both components are positioned in the desired end position and the joining pressure is applied. The laser beam radiates or shines through the transparent component without considerable heating. At first in the absorption component the laser beam is absorbed in a surface near layer, wherein the laser energy is converted in thermal energy and the absorption component is melted at these places. Due to thermal conduction processes, also the transparent component is plasticized in the area of the joining zone. By means of the joining force applied from the outside as well as the inner joining pressure resulting from the expansion of the plastic melt, an adhesive bond connection of the two components is achieved. Here, it may be preferred to use the first waveguide sub-segment as part of a simultaneous laser transmission welding which is subsequently also denoted as simultaneous welding.

At the simultaneous welding, the whole welding contour or seam contour of the components to be welded to each other may be irradiated at the same time. This ensures an extreme reduction of the process times and makes a bridging of the clearances possible by means of melting away. Additionally, the welding seam is stronger compared to the contour welding in which a laser beam is guided along the seam as the simultaneous welding has a higher interaction time.

During the operation of a respective arrangement for plastic welding, especially for laser transmission welding, laser light runs from a laser light source through an often flexible light guide or a bundle of flexible light guides which is coupled at its end facing away from the laser light source to the waveguide. The laser light exits thus the light guide or the bundle of light guides and enters the waveguide, is homogenized in the waveguide and impinges on the components to be welded thereafter.

As has been outlined at the beginning, the negative waveguide is marked by a cavity through which the laser light is guided. Usually, the negative waveguide has a channel like design or construction. The first waveguide sub-segment comprises the first and the second wall, each having a reflecting inner face opposite to each other. Thus, the laser light is guided between the inner face of the first wall and the inner face of the second wall. Accordingly, a depth of the first waveguide sub-segment is defined by the distance between the inner faces.

Further, each wall comprises an exit side and an entry side. The exit side of each wall faces the components to be welded during usage of the first waveguide sub-segment. The exit side may be adapted to a shape of the components to be welded.

The entry side of each wall, on the other hand, comprises at least one portion extending in an angle with respect to the height of the respective wall. As the angle is unequal to zero, which would result in the entry side extending parallel to the height, and unequal to 90°, which would result in the first and second portion of each entry side being arranged in the x,y-plane, the first and second portion must extended in an inclined manner. This will be explained in the following.

For the ease of understanding, the usage of the first waveguide sub-segment in a respective waveguide segment is assumed. In this example, the waveguide segment is a polyhedron having, when viewed in thickness direction, the shape of a rectangle and a diagonally extending line of abutment so that two sub-segments are formed. Each sub-segment being a right triangle. With respect to the first waveguide sub-segment, the right angle is present between the height and the exit side. The entry side thus extends inclined with respect to the height so that the first and second portion of the first and second wall is identical with the entry side of the respective wall. Consequently, the remaining part of the waveguide segment, i.e. the second waveguide sub-segment, has the shape of the corresponding right triangle, wherein the right angle is present between the height and the entry side and the exit side extends in an inclined manner.

In use of this waveguide segment, laser light enters the second sub-segment between the entry sides of each wall, passes through the second sub-segment and exits the second sub-segment between the exit sides of each wall. Now, the laser light enters the first waveguide sub-segment between the entry sides of the walls, passes through the first waveguide sub-segment and exits the first waveguide sub-segment between the exit sides of the walls.

Thus, and during use, laser light exiting the first waveguide sub-segment will enter the upper component of the components to be welded, as is known in the art. In contrast to the known art, the laser light entering the first waveguide sub-segment between the first and second portion has at least partially passed a preceding waveguide sub-segment, may be a matching waveguide sub-segment such as the second waveguide sub-segment, explained in detail below.

An advantage of the construction of the first waveguide sub-segment results when using it in a waveguide segment. Referring to the above example, a width of the waveguide segment may be adjusted due to the two sub-segments. This has the positive effect that a length of the complete waveguide may be adjusted, correspondingly.

In case the two sub-segments are arranged abutting each other, i.e. the exit sides of the walls of the second waveguide sub-segment are in contact with the entry sides of the walls of the first waveguide sub-segment, the waveguide segment has the shape of a square, when viewed in thickness direction. In this state, which can also be referred to as closed state, the width of the waveguide segment is at minimum.

For compensating tolerances, for example in case the components to be welded have a higher width as provided by the waveguide, for example when the waveguide segment is in the closed state, the first and second waveguide sub-segment can be moved with respect to each other in the width direction. Thus, the width of the waveguide segment is increased, which increases also the length of the waveguide. Accordingly, the shape, when viewed in the thickness direction, changes from a square to a rectangle. Especially due to the inclined portion of the first and the second wall, energy losses can be reduced to a minimum while at the same time providing an adjustability of the width of a waveguide segment.

In a further embodiment of the first waveguide sub-segment the first angle $\alpha_1$ and the second angle $\alpha_2$ are equal. Such a design facilitates the usage of the first waveguide sub-segment in combination with another waveguide sub-segment for forming a waveguide segment.

In a first alternative embodiment, it may be preferred that the first and the second wall are mirror-symmetrical so that the first and the second width as well as the first and the second height are equal. This further facilitates the usage of the first waveguide sub-segment.

In a second alternative embodiment of the first waveguide sub-segment the first height is different from the second height and/or the first width is different from the second width. The further advantage of this design is explained referring to the above example of the waveguide segment. First, the design of the first wall in combination with the third wall is discussed, i.e. when viewing the waveguide segment in thickness direction from a first side so that it has the shape of a rectangle. For example, this first side still consists of two right triangles so that the line of abutment of the two sub-segments extends on the first side diagonally. When increasing the width of the waveguide segment by moving the two segments away from each other, a gap results on the first side. As for example the width of the first wall is different from the width of the second wall, the gap on the second side is displaced with respect to the gap in the first side. In other words, a plane defined by the gap in the first and the second side would not only be inclined with respect to the height, as in the above first alternative embodiment, but it would also include an angle with respect to the thickness direction. Due to this design, the energy losses a furthermore decreased.

A second waveguide sub-segment of a negative waveguide for plastic welding, especially for laser transmission welding, comprises: a third wall having a third inner face by means of which laser light can be reflected, a fourth wall having a fourth inner face by means of which laser light can be reflected, wherein the third and the fourth inner face are arranged opposite to each other and a second depth of the second waveguide sub-segment is defined by a distance between the third and the fourth inner face, and the third and the fourth wall comprise an exit side, which faces the components to be welded in operation, and an opposite entry side, wherein a third height of the third wall is defined by a distance between the exit and the entry side of the third wall and a fourth height of the fourth wall is defined by a distance between the exit and the entry side of the fourth wall and a third width of the third wall is defined by an extension of the third wall perpendicular to the third height as well as to the second depth and A fourth width of the fourth wall is defined by an extension of the fourth wall perpendicular to the fourth height as well as to the second depth, wherein the exit side of the third wall extends at least in a third portion in a third angle $\alpha_3$ with respect to the third height, for which applies: $0°<\alpha_3<90°$, or $5°<\alpha_3<85°$ or $10°<\alpha_3<80°$, and the exit side of the fourth wall extends at least in a fourth portion in a fourth angle $\alpha_4$ with respect to the fourth height, for which applies: $0°<\alpha_4<90°$, or $5°<\alpha_4<85°$ or $10°<\alpha_4<80°$, wherein during usage of the second waveguide sub-segment, laser light exits the second waveguide sub-segment between third and fourth portion and enters into a waveguide sub-segment which is arranged successive in radiation direction.

A difference between the second waveguide sub-segment and the above described first waveguide sub-segment is that in the second waveguide sub-segment the inclined portions are present at the exit sides of the walls instead of at the entry sides. With respect to the resulting advantages, it is referred to the above explanation of the first waveguide sub-segment especially when using it in a waveguide segment.

In a further embodiment of the second waveguide sub-segment the third angle $\alpha_3$ and the fourth angle $\alpha_4$ are equal. As explained above, such a design facilitates the usage of the second waveguide sub-segment in combination with another waveguide sub-segment, such as the first waveguide sub-segment, for forming a waveguide segment.

In a first alternative embodiment, it may be preferred that the third and the fourth wall are mirror-symmetrical so that the third and the fourth width as well as the third and the fourth height are equal. This further facilitates the handling of the second waveguide sub-segment.

In a second alternative embodiment, it may be preferred that the third height is different from the fourth height and/or the third width is different from the fourth width. With respect to the design resulting from such a construction, it is referred to the above explanation of the first waveguide sub-segment. This applies also in view of the resulting advantages.

A waveguide segment of a negative waveguide for plastic welding, especially for laser transmission welding, comprises a first waveguide sub-segment as well as a second waveguide sub-segment according, wherein the first portion faces the third portion and the second portion faces the fourth portion, and the first and the second waveguide sub-segment are movable relative to each other along at least one axis such that a width of the waveguide segment is adjustable by varying a distance between the first and the second waveguide sub-segment.

With respect to the general function and the advantages resulting therefrom, it is referred to the explanation of the first waveguide sub-segment. In this regard, it may be preferred that the portions facing each other are designed such that they match each other in the closed state of the waveguide segment. Further, it may be preferred to provide the waveguide segment initially in a state in which a gap is present between the first and the second waveguide sub-segment, i.e. the first and the second waveguide sub-segment are not abutting each other. This increases further the flexibility as the width of the waveguide segment may not only be increased but it may also be reduced compared to the initial state.

In a further embodiment, the waveguide segment comprises a coupling structure by means of which the waveguide segment is connectable to a tool. Further, such a coupling structure may be used for coupling one or more light guides to the waveguide. Thus, by means of the coupling structure, the waveguide segment may be integrated into a respective tool of a welding arrangement.

Further, the waveguide segment may comprise an adjusting structure which is connected at one end to the coupling structure and at a second end to the first and/or third wall, especially by means of at least one guiding means for guiding the first and/or second waveguide sub-segment along at least the axis defined by the width of the waveguide segment. Thus, the adjustment of the width of the waveguide segment may take place by means of the adjusting structure without the requirement of disassembling and reassembling the waveguide segment.

Furthermore, in an embodiment, the first and the second waveguide sub-segment of the waveguide segment are moveable with respect to each other along the axis defined by the width of the waveguide segment and/or the distance between the first and the second waveguide sub-segment is between 0 mm and 8 mm, and/or between 0 mm and 5 mm. This embodiment facilitates the adjustment of the waveguide segment and ensures on the other hand, due to the distances provided, an effective control of possible energy losses.

A tool has a waveguide with a plurality of waveguide segments, at least one of which is a waveguide segment. Concerning the resulting advantages, it is referred to the above explanations, which apply also to the tool. The tool may either be an upper tool or a lower tool. The tool may be an upper tool. Especially, such a tool has the advantage that the length of the waveguide can be adjusted by adjusting the width of the waveguide segment.

In a further embodiment of the tool, a distance between two adjacent waveguide segments is adjustable, wherein a resulting gap extends parallel to the height of the waveguide segments. Thus, the tool consisting of a plurality of waveguide segments provides several possibilities for adjusting the length of the waveguide, providing in use an actual welding seam line, to the desired welding seam line. In this regard, it may be preferred to use first of all the adjustment possibility provided by the waveguide segment. In case further adjustment is required, the distance between two adjacent waveguide segments may be adjusted, too. In this regard, the adjustment of adjacent waveguide segments is less preferred, as it causes higher energy losses compared to the adjustment of the waveguide segment due to the gap extending parallel to the height of the waveguide segments.

Advantageously, the tool comprises at least two waveguide segments which may be equally spaced from each other with respect to a total length of the waveguide. The positive effect of such an arrangement can be seen based on the following example. The components to be welded to each other shall be welded according to a welding seam line which is rectangular. For effectively adjusting the welding seam line provided by the waveguide of the tool in use, two waveguide segments are used. They may be arranged on the long sides of the rectangle as deviations on the long side have more influence compared to tolerances being present on the short side of the rectangular. This can be ensured, for example, by arranging the waveguide segments equally spaced from each other. Further, it may be preferred, especially in view of such a rectangular shape, to use four waveguide segments, one associated to each side of the rectangle. This provides a maximum adjustability for compensating tolerances.

An arrangement for plastic welding, especially for laser transmission welding, comprises: a laser light source, a light guide, may be a plurality of light guides, and a tool, wherein, in operation of the arrangement, the laser light passes from the laser light source through the light guide and subsequently through the waveguide as well as in the waveguide at least partially from the second waveguide sub-segment into the first waveguide sub-segment. Concerning the resulting technical effects and advantages, we refer to the above remarks.

The length adjustment method of a negative waveguide of a tool comprises the steps: determining a desired length of the waveguide which is required for the welding of two plastic components to each other based on the intended welding seam line, comparing the determined desired length with an actual length of the waveguide, and adjusting the actual length of the waveguide to the desired length by means of varying the distance between the first and the second waveguide sub-segment. By means of this method, the length of the waveguide is adjusted to compensate tolerances, as explained above. The resulting technical effects as well as the advantages correspond also to the above discussed effects and advantages.

The length adjustment method may be performed prior to a non-stop operation of the tool. Further, it may be preferred to perform the length adjustment method after a predetermined time interval. By proceeding this way, further tolerances due to the tool and/or arrangement which may result from a non-stop operation may be compensated. Also, and in an embodiment, the length adjustment method may be performed at least partly automatically by means of a control unit and respective sensors for measuring the difference between the desired welding seam line and the actual welding seam line.

A method for plastic welding, especially for laser transmission welding, comprises the following steps: arranging two plastic components to be welded to each other in a mounting device, creating laser light by means of a laser light source, wherein the laser light passes through a light guide, which may be a plurality of light guides, and subsequently through a waveguide of a tool, and welding the plastic components to be welded to each other by means of the laser light exiting the waveguide. This method uses, thus, the waveguide segment, so that we refer to the respective remarks above.

A manufacturing method of a first waveguide sub-segment and/or of a second waveguide sub-segment, comprises the steps: providing a first wall extending at least in the first portion at the entry side in the first angle $\alpha_1$ with respect to the first height, for which applies: $0°<\alpha_1<90°$, or $5°<\alpha_1<85°$ or $10°<\alpha_1<80°$, and providing a second wall extending at least in the second portion at the entry side in a second angle $\alpha_2$ with respect to the second height, for which applies: $0°<\alpha_2<90°$, or $5°<\alpha_2<85°$ or $10°<\alpha_2<80°$, applying a reflecting layer on the first and the second inner face, and arranging the first inner face opposite to the second inner face so that the first depth of the first waveguide sub-segment is defined by a distance between the first and the second inner face, and/or the method comprises providing a third wall extending at least in the third portion at the exit side in the third angle $\alpha_3$ with respect to the third height, for which applies: $0°<\alpha_3<90°$, or $5°<\alpha_3<85°$ or $10°<\alpha_3<80°$, and providing a fourth wall extending at least in the fourth portion at the exit side in a fourth angle $\alpha_4$ with respect to the fourth height, for which applies: $0°<\alpha_4<90°$, or $5°<\alpha_4<85°$ or $10°<\alpha_4<80°$, applying a reflecting layer on the third and the fourth inner face, and arranging the third inner face opposite to the fourth inner face so that the second depth of the second waveguide sub-segment is defined by a distance between the third and the fourth inner face. Consequently, the first and/or second waveguide sub-segment are produced by means of this method. Concerning the resulting advantages, it is thus referred to the above statements for the respective sub-segments.

BRIEF DESCRIPTION OF THE DRAWINGS

In the following, the present disclosure will be described in detail based on the drawings. In the drawings, the same reference signs denote the same elements and/or components. It shows.

DETAILED DESCRIPTION

Generally, the waveguides described in the following can be used in any process in which laser light has to be guided to a welding zone. Exemplarily, the usage of the waveguide is explained in an arrangement for plastic welding, especially for laser transmission welding. Furthermore, the embodiments described in the following must not define an individual waveguide but may be a section of a waveguide portion or an integral part of a waveguide.

At the laser transmission welding, a first component of plastic, which is often denoted as transmission component, is welded to a second component, which is often denoted as absorption component, by means of laser light and with the application of pressure. The transmission component or a portion of the transmission component is arranged adjacent to the waveguide as the laser beam shines through it without considerable heating. The absorption component or a portion of the absorption component is arranged on the side of the transmission component or the portion of the transmission component which is opposite to the waveguide. At first in the absorption component the laser light is absorbed in a surface near layer, wherein the laser energy is converted in thermal energy and the absorption component is melted at these places. The waveguide is used for example for applying the necessary joining pressure. Due to thermal conduction processes, also the transparent component is plasticized in the area of the joining zone. By means of the joining pressure applied from the outside as well as the inner joining pressure resulting from the expansion of the plastic melt, an adhesive bond connection of the two components is achieved. Here, it may be preferred to use the waveguide as part of a simultaneous laser transmission welding. In this method, the whole welding contour or seam contour of the components to be welded to each other may be irradiated at the same time. This ensures an extreme reduction of the process times and makes a bridging of the clearances possible by means of melting away. Additionally, the welding seam is stronger compared to the contour welding in which a laser beam is guided along the seam as the simultaneous welding has a higher interaction time.

Figure 1:
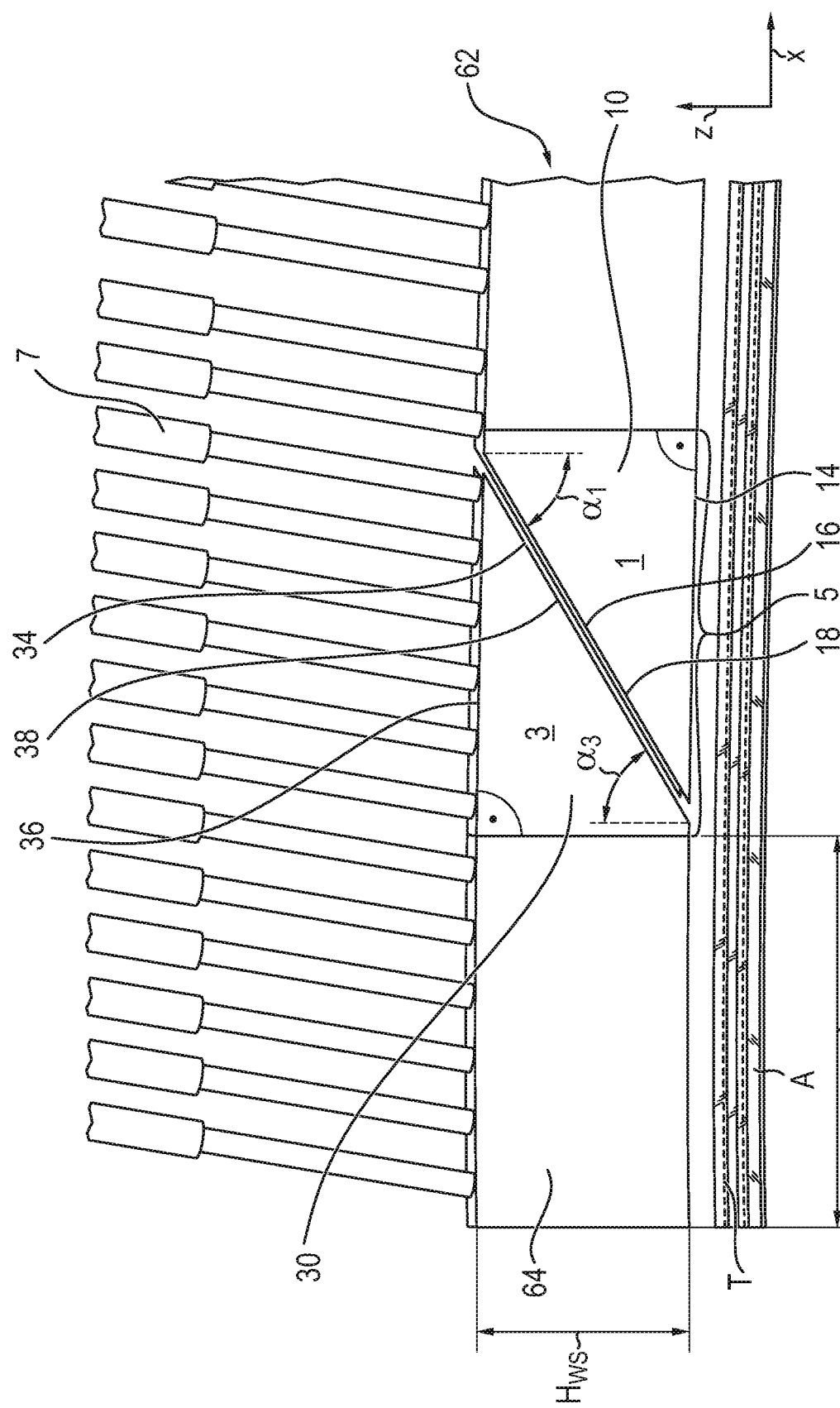
FIG. 1 a perspective view of a schematic waveguide including an embodiment of a waveguide segment, FIG. 2 a perspective view of a further embodiment of a waveguide segment, FIG. 3 a perspective view of a further waveguide including an embodiment of a waveguide segment, FIG. 4 a perspective view of another waveguide including an embodiment of a waveguide segment, FIG. 5 a perspective view of another waveguide including an embodiment of a waveguide segment, FIG. 6 a perspective view of an embodiment of a tool, FIG. 7 an enlarged view of the left side of the tool according to FIG. 6, FIG. 8 an enlarged view of the left side of the tool according to FIG. 7, FIG. 9 a flow chart of an embodiment of a length adjustment method, FIG. 10 a flow chart of an embodiment of a method for plastic welding, FIG. 11a a flow chart of an embodiment of a manufacturing method of a first waveguide sub-segment, and FIG. 11b a flow chart of an embodiment of a manufacturing method of a second waveguide sub-segment.

Now referring to FIG. 1, a perspective view of a waveguide 62 is shown. As it is known in the art, light guides 7 are coupled to the waveguide 62 at an entry end of the waveguide 62. During operation, light thus passes from the entry end through the waveguide 62 and exits the waveguide 62 at an exit end, shines through an upper transmission component T and heats a lower absorption component A. In the present example, the transmission component T is T-shaped and the absorption component A has the shape of a bar. Both components T, A extend straightly linear and parallel to each other. Accordingly, the waveguide 62 is aligned with a welding seam line to be produced, i.e. the waveguide 62 is arranged centered on the upper transmission part T.

The waveguide 62 shown has two regular waveguide segments 64 and one waveguide segment 5 according to an embodiment. The waveguide segments 64, 5 are arranged abutting each other but separate from each other, as indicated by the straight line of abutment extending in the radiation direction of the laser light. For increasing the understanding of the waveguide segment 5, first of all the structure of the regular waveguide segments 64 is explained, which have a height $H_{WS}$, a width $W_{WS}$ and a depth $D_{WS}$.

The regular waveguide segments 64 consist each of two walls defining a cavity therebetween. In FIG. 1, only one wall can be seen. Each wall of the regular waveguide segments 64 has the shape of a rectangle, wherein the width is larger compared to the height. Further, the distance between the two walls defines a depth of the regular waveguide segment 64. In this regard, the terms depth, width and height as used throughout the description and the claims correspond to the Cartesian coordinate system with depth and width defining the x,y-plane while the height defines the z-axis. A respective Cartesian coordinate system is indicated in FIG. 1, wherein the x-axis extends parallel to the components to be welded and thus indicates the width of the regular waveguide segment 64. The z-axis indicates the height and the y-axis extends out of the figure and in depth direction.

Furthermore, each wall of the regular waveguide segment 64 has an entry side and an exit side. The entry side being arranged adjacent to the light guides and the exit side being arranged adjacent to the transmission component T. Thus, in operation, laser light enters the cavity formed between the two walls of the regular waveguide segments 64 adjacent to the entry side of each wall, is reflected at the inner faces of the walls, which may be coated with a reflecting layer, and exits the waveguide, i.e. the cavity formed between the two walls, adjacent to the exit side of the walls.

Assuming that the waveguide 62 would be too short, i.e. does not have a sufficient width, for covering the complete weld seam line of the components to be welded, the width must be increased. This could be done by means of increasing the distance between two adjacent waveguide segments 64. However, and as can be seen from FIG. 1, this would lead to portions where no waveguide is present. Accordingly, the quality of the resulting weld seam may be negatively affected.

A solution in this regard is provided by the welding segment 5 shown in the middle of the waveguide 62 in FIG. 1. This waveguide segment 5 consists of a first waveguide sub-segment 1 and a second waveguide sub-segment 3.

The first waveguide sub-segment 1 comprises a first wall 10 and a second wall 20. The first wall 10 has, opposite to a first outer face 13, a first inner face 12 by means of which laser light can be reflected and the second wall 20 has, opposite to a second outer face 23, a second inner face 22 by means of which laser light can be reflected. Also, the first 10 and the second wall 20 comprise an exit side 14, 24, which faces the components to be welded in operation, and an opposite entry side 16, 26.

As explained for the regular waveguide segments 64, a first depth $D_1$ of the first waveguide sub-segment 1 is defined by a distance between the first 12 and the second inner face 22. Accordingly, a first height $H_1$ of the first wall 10 is defined by a distance between the exit 14 and the entry side 16 of the first wall 10 and a second height $H_2$ of the second wall 20 is defined by a distance between the exit 24 and the entry side 26 of the second wall 20. Further, a first width $W_1$ of the first wall 10 is defined by an extension of the first wall 10 perpendicular to the first height $H_1$ as well as to the first depth $D_1$ and a second width $W_2$ of the second wall 20 is defined by an extension of the second wall 20 perpendicular to the second height $H_2$ as well as to the first depth $D_1$. In this regard, only the first wall 10 can be seen in FIG. 1, as also explained above.

Furthermore, the entry side 16 of the first wall 10 extends at least in a first portion 18 in a first angle $\alpha_1$ with respect to the first height $H_1$. In the present example, the first angle $\alpha_1$ is about 60°. Nevertheless, other values for the first angle $\alpha_1$ may be preferred, as long as the value is between 0° and 90°, or between 5° and 85° or between 10° and 80°. Thus, the first portion 18 is inclined with respect to the first height $H_1$.

In the example shown, the second wall 20 is formed mirror symmetrical to the first wall 10 so that the same applies for the second wall 20. Accordingly, the first 18 and the second portion 28 extend parallel to each other so that a plane defined by the first 18 and second portion 28 is inclined with respect to the height and with respect to the width but is parallel to the depth. In different examples, the second angle $\alpha_2$ may be different from the first angle $\alpha_1$. Also, it may be preferred that the second width $W_2$ and/or the second height $H_2$ of the second wall 20 are different from the first wall 10.

The second waveguide sub-segment 3 is formed complementary to the first waveguide sub-segment 1 in FIG. 1. Accordingly, the second waveguide sub-segment 3 comprises a third wall 30 and a fourth wall 40, each having inner 32, 42 and outer faces 33, 43. By means of the inner faces 32, 42 laser light can be reflected. Also, the third 30 and the fourth wall 40 comprise exit sides 34, 44 and entry sides 36, 46.

A second depth $D_2$ of the second waveguide sub-segment 3 is defined by a distance between the third 32 and the fourth inner face 42. Thus, the definition for the third $H_3$ and fourth height $H_4$ as well as for the third $W_3$ and fourth width $W_4$ apply analogously. Also, only the third wall 30 can be seen in FIG. 1.

In contrast to the first waveguide sub-segment 1, where the entry side 16 comprises an inclined first portion 18, here the exit side 34 of the third wall 30 extends at least in a third portion 38 in a third angle $\alpha_3$ with respect to the third height $H_3$. In the present example, the third angle $\alpha_3$ is about 60°, and thus equal to the first angle $\alpha_1$. Nevertheless, other values for the third angle $\alpha_3$ may be preferred, as long as the value is between 0° and 90°, or between 5° and 85° or between 10° and 80°. In this regard, it may be preferred that the first angle $\alpha_1$ and the third angle $\alpha_3$ are equal. Thus, the third portion 38 is inclined with respect to the third height $H_3$.

In the example shown, the fourth wall 40 is formed mirror symmetrical to the third wall 30 so that the same applies for the second wall 40. Accordingly, the third 38 and the fourth portion 48 extend parallel to each other so that a plane defined by the third 38 and fourth portion 48 is inclined with respect to the height and with respect to the width but is parallel to the depth. In different examples, the fourth angle $\alpha_4$ may be different from the third angle $\alpha_3$. Also, it may be preferred that the fourth width $W_4$ and/or the fourth height $H_4$ of the fourth wall 40 are different from the third wall 30. Nevertheless, it may be preferred that the first $\alpha_1$ and third angle $\alpha_3$ as well as the second $\alpha_2$ and fourth angle $\alpha_4$ are equal to each other. Further, it may be preferred that the first 10 and third wall 30 as well as the second 20 and fourth wall 40 are formed in a matching manner with respect to angles $\alpha_1$, $\alpha_2$, $\alpha_3$, $\alpha_4$ and heights $H_1$, $H_2$, $H_3$, $H_4$.

In use of the waveguide segment 5, laser light enters the second sub-segment 3 between the entry sides 36, 46 of each wall 30, 40, passes through the second sub-segment 3 and exits the second sub-segment 3 between the exit sides 34, 44 of each wall 30, 40. Now, the laser light enters the first waveguide sub-segment 1 between the entry sides 16, 26 of the walls 10, 20, passes through the first waveguide sub-segment 1 and exits the first waveguide sub-segment 1 between the exit sides 14, 24 of the walls 10, 20.

An advantage of the construction of the waveguide segment 5 results when a length of the waveguide has to be adjusted as this can be done by adjusting the width $W_{WS}$ of the waveguide segment 5, as explained above. In case the two sub-segments 1, 3 are arranged abutting each other, i.e. the third 38 and fourth portion 48 of the exit sides 34, 44 of the walls 30, 40 of the second waveguide sub-segment 5 are in contact with the first 18 and the second portion 28 at the entry sides 16, 26 of the walls 10, 20 of the first waveguide sub-segment 1, the waveguide segment 5 has the shape of a rectangle, which corresponds to the rectangle of the regular waveguide segments 64, when viewed in thickness direction. In this state, which can also be referred to as closed state, the width $W_{WS}$ of the waveguide segment 5 is at minimum.

For compensating tolerances, for example in case the components T, A to be welded have a higher width or length as provided by the waveguide segment 5 in the closed state, the first 1 and second waveguide sub-segment 3 can be moved with respect to each other in the width direction. The distance between the first 1 and the second waveguide sub-segment 3 may be varied between 0 mm and 8 mm, or between 0 mm and 5 mm. Thus, the width of the waveguide segment 5 is increased. Especially due to the inclined portions 18, 28, 38 and 48 of the first 1 and the second waveguide sub-segment 3, energy losses can be reduced to a minimum while at the same time providing an adjustability of the width $W_{WS}$ of a waveguide segment 5.

For further increasing the flexibility, the first 1 and second waveguide sub-segment 3 are initially arranged spaced from each other. Due to this, the width $W_{WS}$ of the waveguide segment 5 may not only be increased but it may also be decreased for adapting an actual welding seam line provided by the waveguide 62 to a desired welding seam line, as also explained below.

Figure 2:
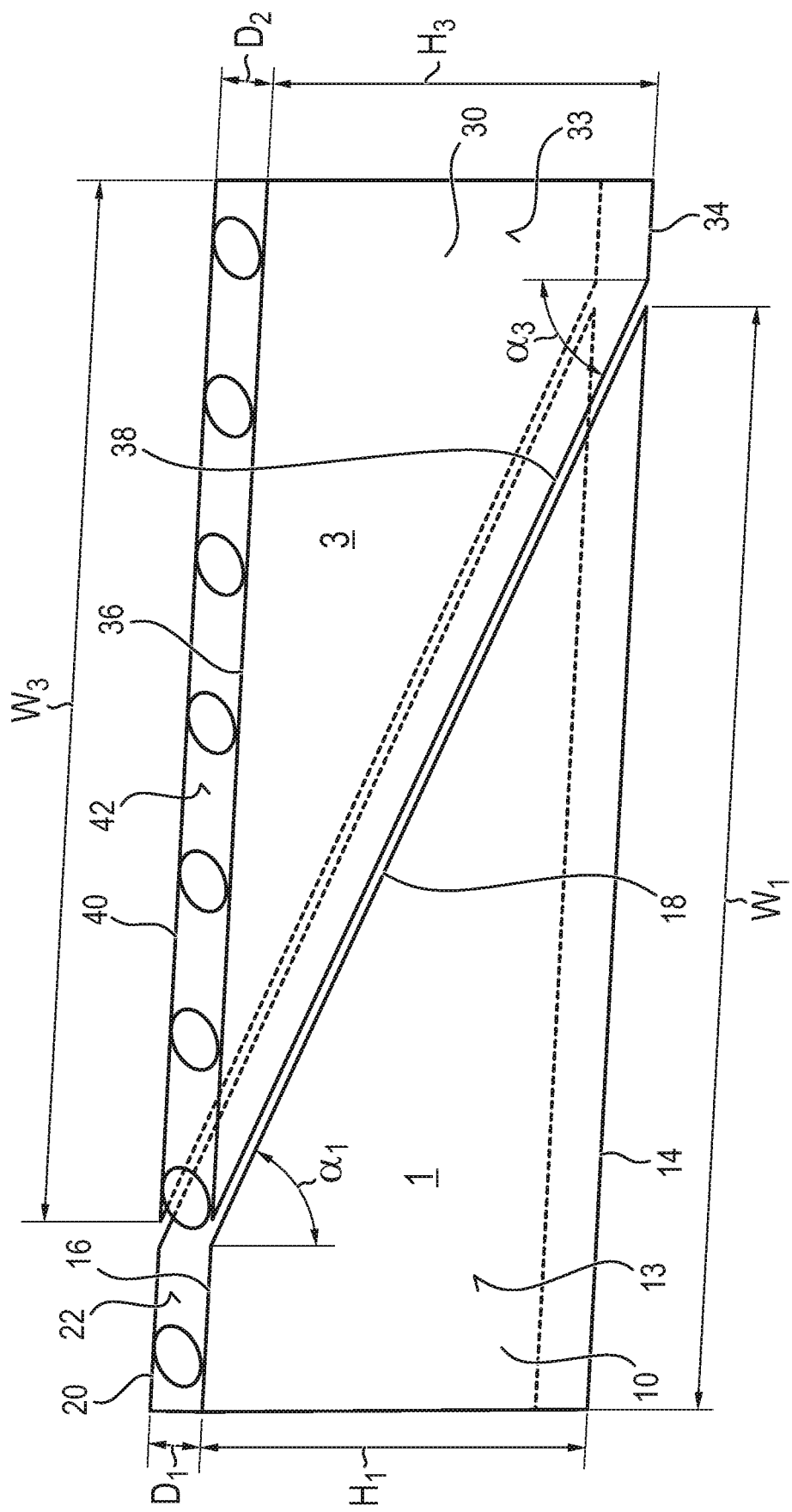

FIG. 2 shows a perspective view of another embodiment of waveguide segment 5 consisting of a first 1 and a second waveguide sub-segment 3. Same elements are denoted with the same reference signs. In contrast FIG. 1, the angles $\alpha_1$, $\alpha_2$, $\alpha_3$, $\alpha_4$ are here about 69° and the light guides are not shown but indicated by circles.

Figure 3:
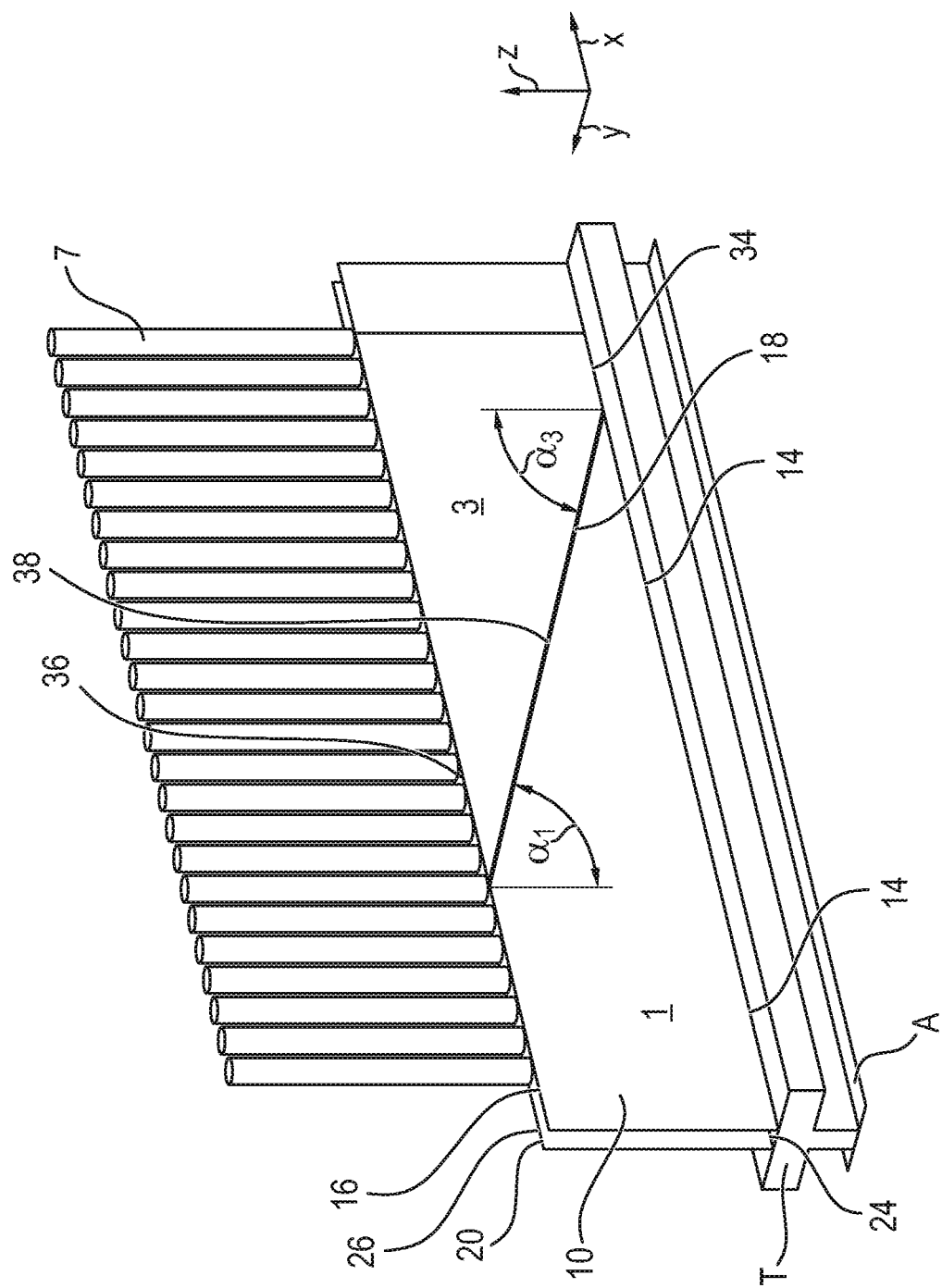
Figure 4:
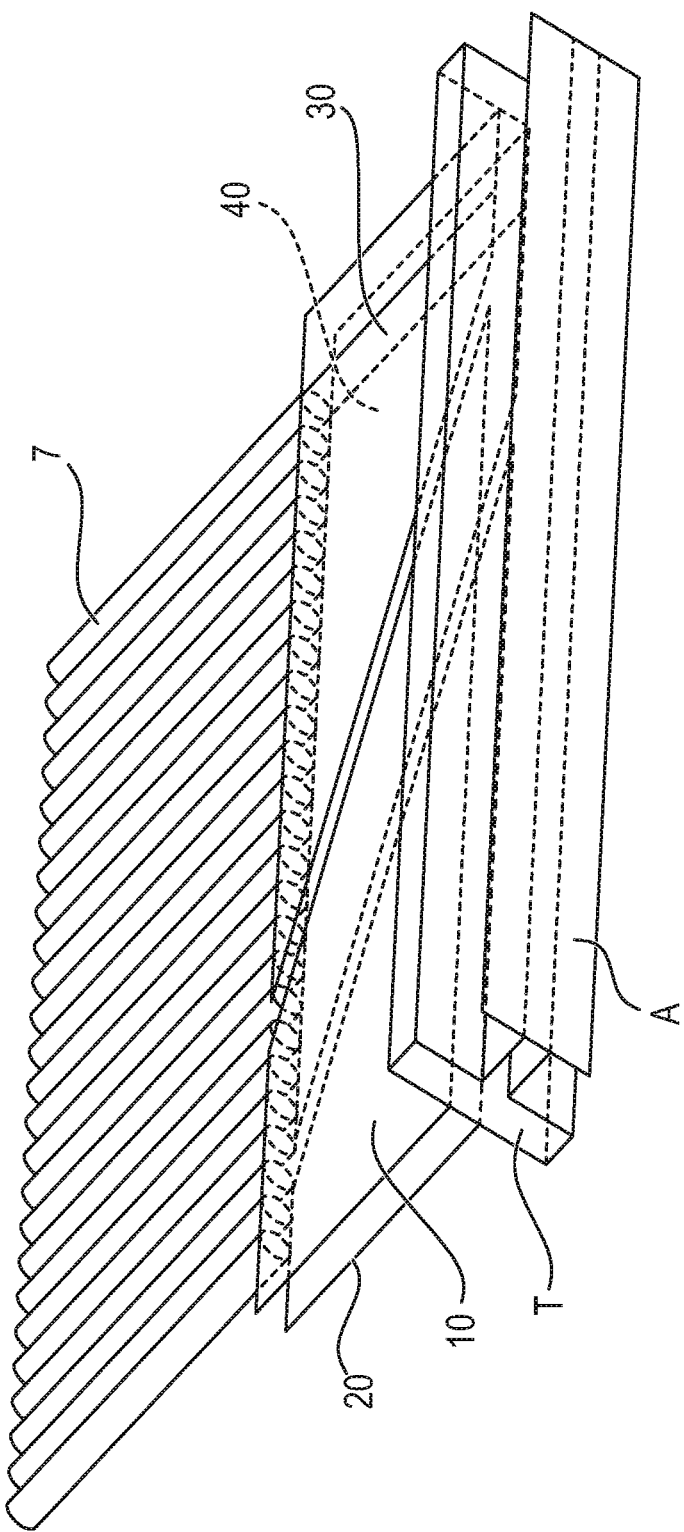

Still a further embodiment is shown in FIGS. 3 and 4. Here, the angles $\alpha_1$, $\alpha_2$, $\alpha_3$, $\alpha_4$ are about 70°. In the remaining, it is referred to the above explanations.

Figure 5:
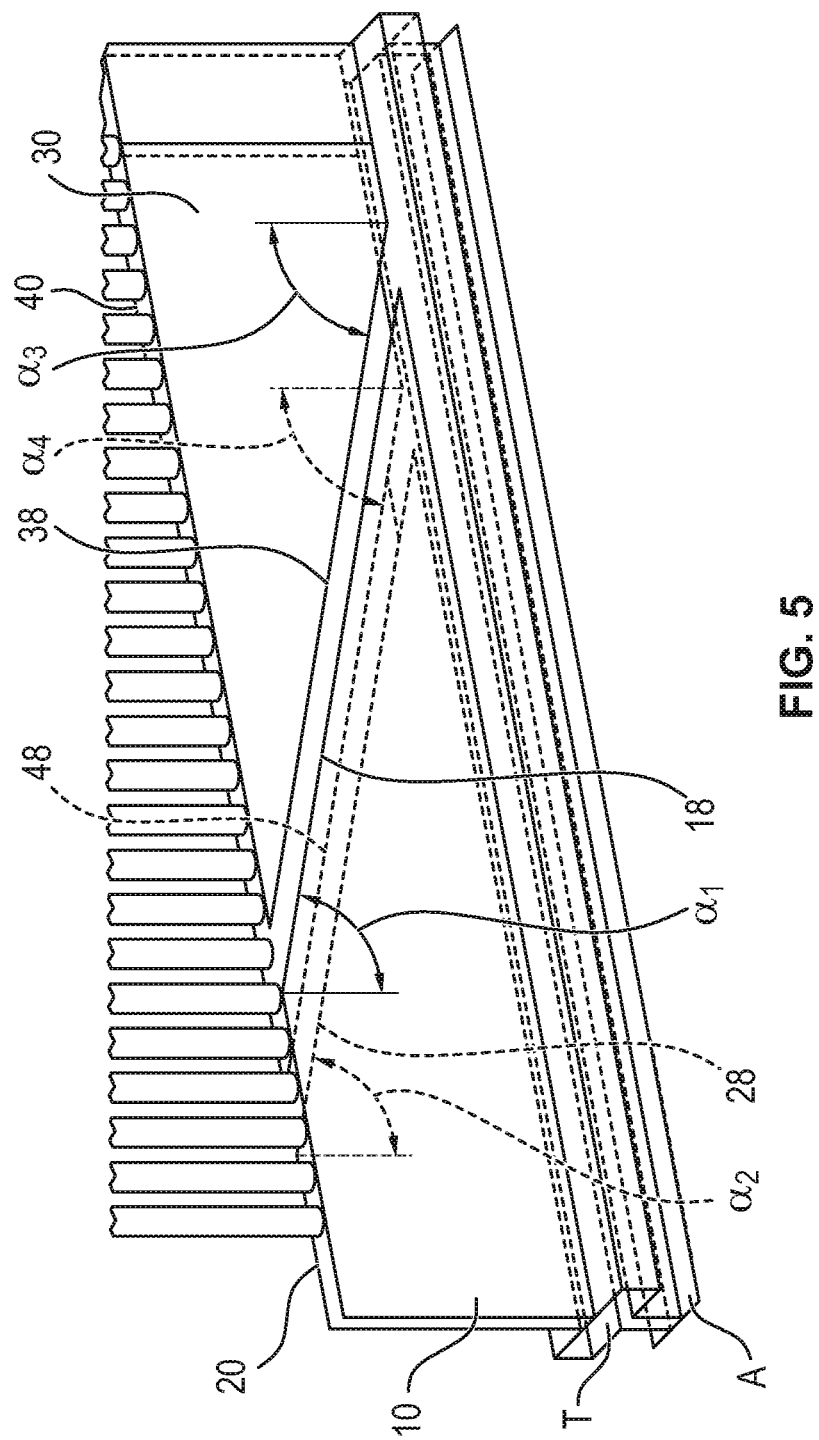

With respect to FIG. 5, an embodiment is shown wherein the first width $W_1$ is different from the second width $W_2$ and the third width $W_3$ is different from the fourth width $W_4$. As a result, the gap on the second side, i.e. formed between the second 20 and the fourth wall 40, is displaced with respect to the gap in the first side, i.e. between the first 10 and the third wall 30. In other words, a plane defined by the gaps in the first and the second side would not only be inclined with respect to the height and the width direction, as in the above examples, but it would also include an angle with respect to the thickness direction. Due to this design, the energy losses a furthermore decreased as the gaps are not arranged parallel to each other.

Figure 6:
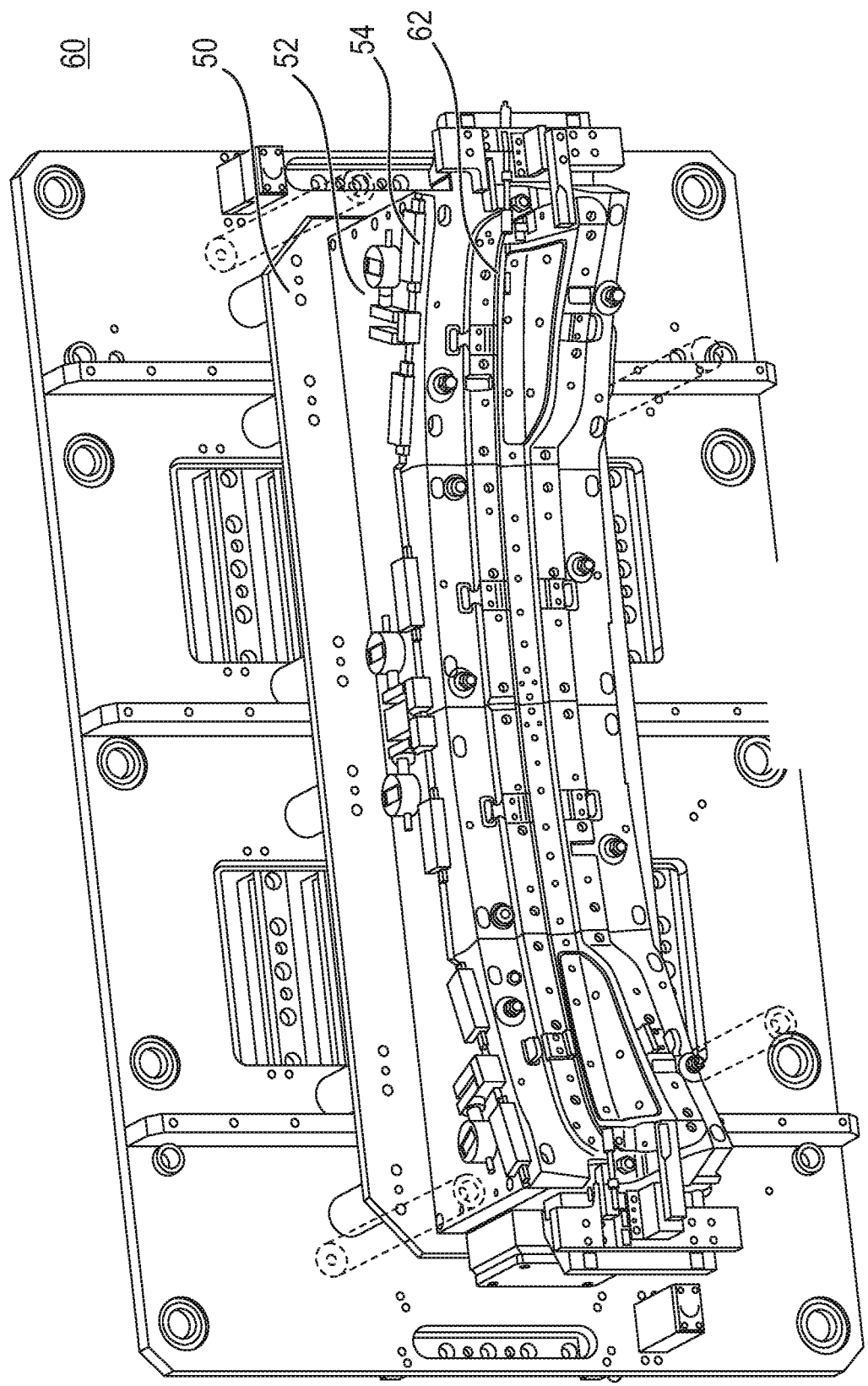
Figure 7:
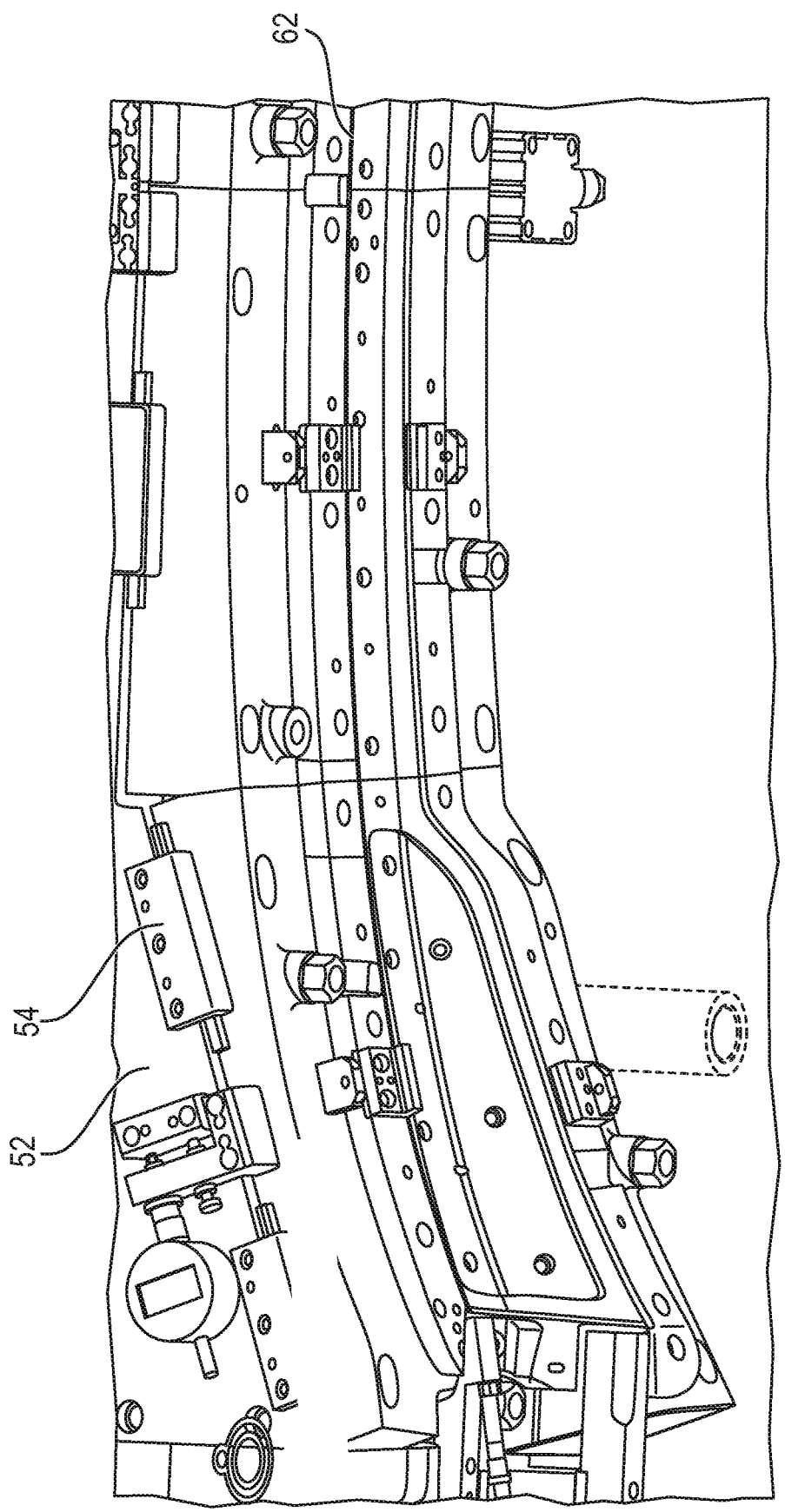
Figure 8:
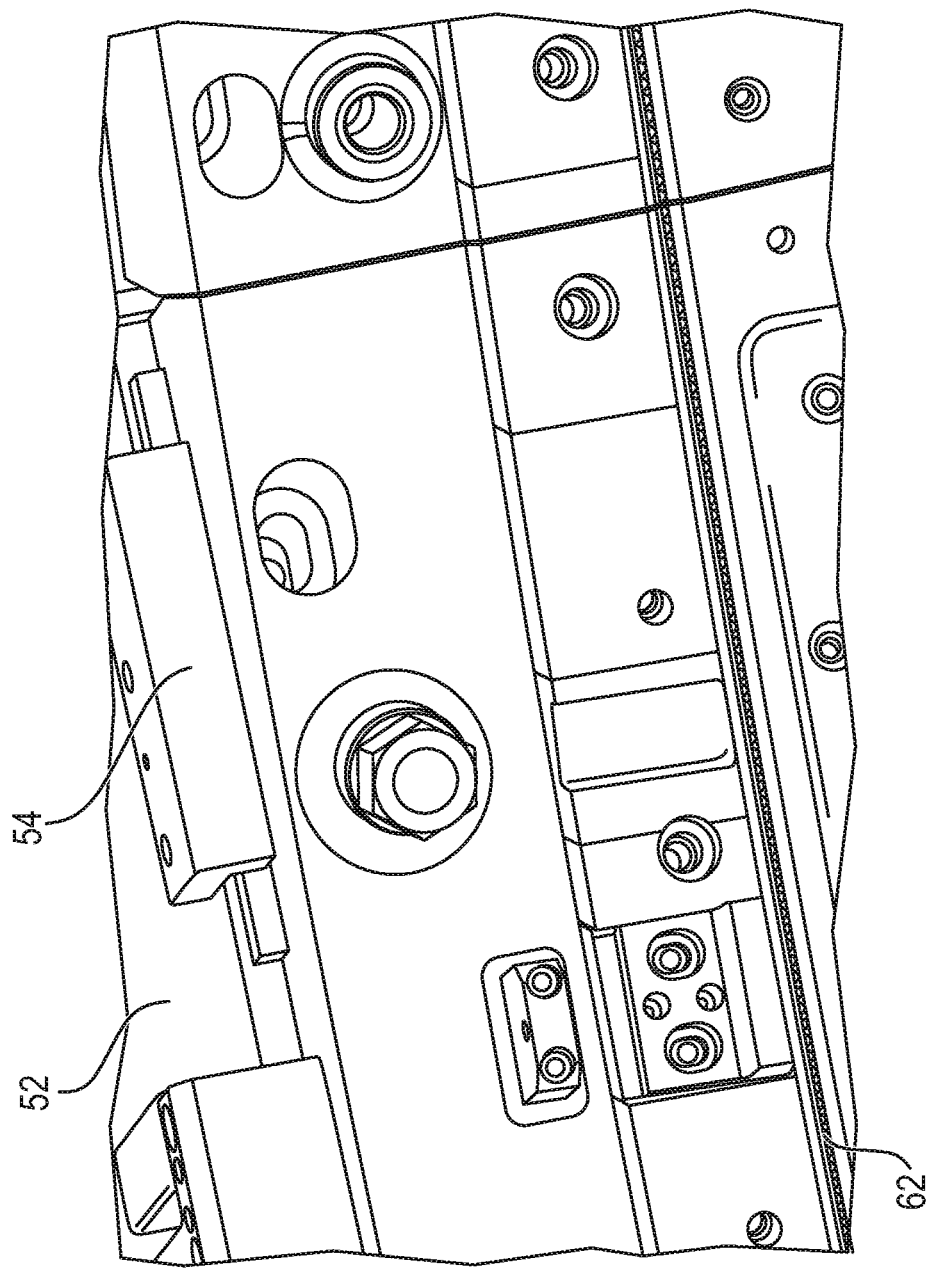

Now referring to FIGS. 6 to 8, a respective tool 60 is discussed in detail. The tool 60 has a waveguide 62 with a plurality of regular waveguide segments 64, as explained above. Further, the waveguide 62 consists of one waveguide segment 5 according to an embodiment. In the example shown, the waveguide 62 is designed to cover a rectangular welding seam line and the tool 60 is an upper tool, although it may be also a lower tool.

Further, and as explained above especially with respect to FIG. 1, a distance between two adjacent waveguide segments 64, 5 is adjustable, wherein a resulting gap extends parallel to the height $H_{WS}$ of the waveguide segments 64, 5. Thus, the tool 60 consisting of a plurality of waveguide segments 64, 5 provides several possibilities for adjusting the length of the waveguide 62, providing in use an actual welding seam line, to the desired welding seam line. In this regard, it may be preferred to use first of all the adjustment possibility provided by the waveguide segment 5. In case further adjustment is required, the distance between two adjacent waveguide segments 64, 5 may be adjusted, too. In this regard, the adjustment of adjacent waveguide segments 64, 5 is less preferred, as it causes higher energy losses compared to the adjustment of the waveguide segment 5 due to the gap extending parallel to the height of the waveguide segments 64, 5.

The tool comprises at least two waveguide segments 5 which may be equally spaced from each other with respect to a total length of the waveguide 62. In the example shown, the components to be welded to each other shall be welded according to a welding seam line which is rectangular. Thus, the waveguide 62 provides a rectangular welding seam line. For effectively adjusting the welding seam line provided by the waveguide 62 of the tool 60 in use, two waveguide segments 5 are used. They may be arranged on the long sides of the rectangle as deviations on the long side have more influence compared to tolerances being present on the short side of the rectangle. This can be ensured, for example, by arranging the waveguide segments 5 equally spaced from each other. Further, it may be preferred, in view of such a rectangular shape, to use four waveguide segments 5, one associated to each side of the rectangle. This provides a maximum adjustability for compensating tolerances.

The waveguide segments 64, 5 comprise a coupling structure 50 by means of which the respective waveguide segment 64, 5 is connectable to the tool 60. In the example shown, all waveguide segments 64, 5 are coupled to the tool 60 by means of one common coupling structure 50. Further, such a coupling structure 50 may be used for coupling one or more light guides 7 to the waveguide segments 64, 5. Thus, by means of the coupling structure 50, the waveguide segments 64, 5 may be integrated into a respective tool 60 of a welding arrangement.

Also, the waveguide segments 64, 5 comprise an adjusting structure 52 which is connected at one end to the coupling structure 50 and at a second end to the first 10 and/or third wall 30, especially by means of at least one guiding means 54 for guiding the first 1 and/or second waveguide sub-segment 3 along at least the axis defined by the width $W_{WS}$ of the waveguide segment 64, 5. Thus, the adjustment of the width $W_{WS}$ of the waveguide segment 5 and/or the length of the waveguide 62 may take place by means of the adjusting structure 52 without the requirement of disassembling and reassembling the waveguide 62.

Figure 9:
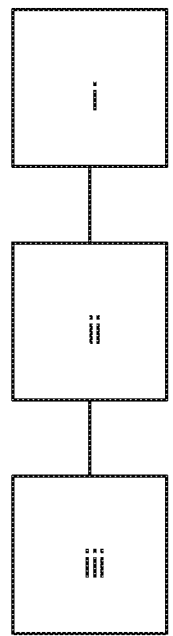

Referring now to FIG. 9, an embodiment of a length adjustment method is explained. In a first step i, a desired length of the waveguide which is required for the welding of two plastic components to each other based on the intended welding seam line is determined. Thereafter, the determined desired length is compared in step ii with an actual length of the waveguide. Finally, the actual length of the waveguide is adjusted to the desired length by means of varying the distance between the first and the second waveguide sub-segment in step iii.

The length adjustment method may be performed prior to a non-stop operation of the tool. Further, it may be preferred to perform the length adjustment method after a predetermined time interval. By proceeding this way, further tolerances due to the tool and/or arrangement which may result from a non-stop operation may be compensated. Also, and in a further embodiment, the length adjustment method may be performed at least partly automatically by means of a control unit and respective sensors for measuring the difference between the desired welding seam line and the actual welding seam line.

Figure 10:
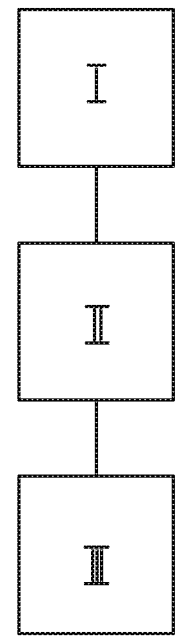

A method for plastic welding, especially for laser transmission welding, with an arrangement is illustrated based on FIG. 10. In a first step I, the two plastic components to be welded to each other are arranged in a mounting device. In the subsequent step II, laser light is created by means of a laser light source, wherein the laser light passes through a light guide, which may be a plurality of light guides, and subsequently through a waveguide of a tool. A welding of the plastic components to be welded to each other by means of the laser light exiting the waveguide is performed in step III.

Figure 11A:
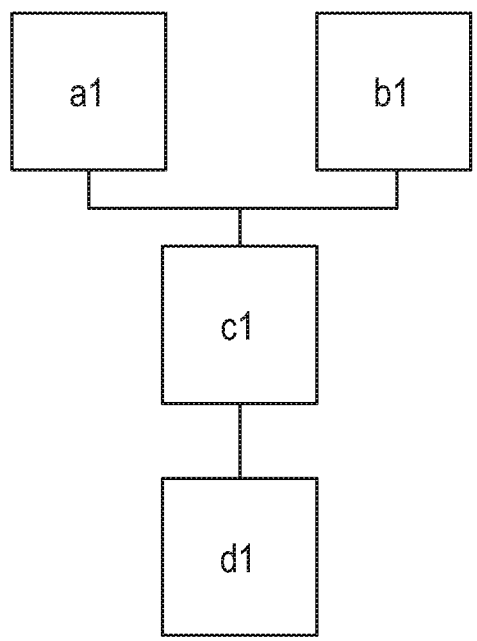

With respect to FIG. 11a, an embodiment of a manufacturing method of a first waveguide sub-segment is explained. A first wall extending at least in the first portion at the entry side in the first angle $\alpha_1$ with respect to the first height, for which applies: $0°<\alpha_1<90°$, or $5°<\alpha_1<85°$ or $10°<\alpha_1<80°$, is provided in a first step a1. In a second step b1, a second wall extending at least in the second portion at the entry side in a second angle $\alpha_2$ with respect to the second height, for which applies: $0°<\alpha_2<90°$, or $5°<\alpha_2<85°$ or $10°<\alpha_2<80°$, is provided. Both steps may occur at the same time or in an arbitrary order.

A reflecting layer is applied on the first and the second inner face in a third step c1. Thereafter, the first inner face is arranged opposite to the second inner face in step d1 so that the first depth of the first waveguide sub-segment is defined by a distance between the first and the second inner face.

Figure 11B:
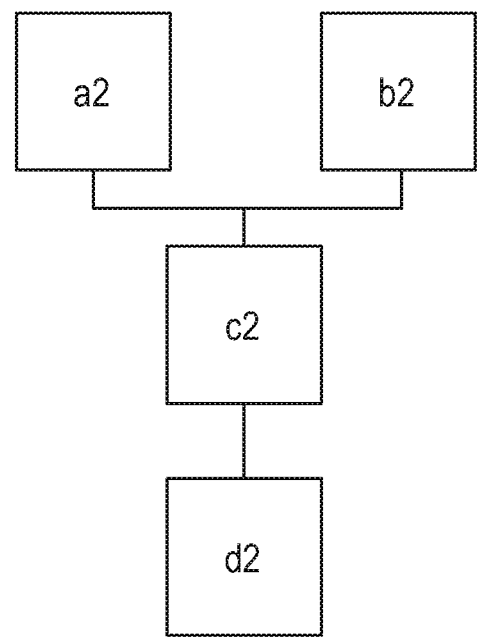

An embodiment of a manufacturing method of the second waveguide sub-segment is shown in FIG. 11b. This method corresponds to the above explained manufacturing method for the first waveguide sub-segment, except that the third and fourth walls differ from the first and second walls, as explained above. Thus, in a first step a2, a third wall extending at least in the third portion at the exit side in the third angle $\alpha_3$ with respect to the third height, for which applies: $0°<\alpha_3<90°$, or $5°<\alpha_3<85°$ or $10°<\alpha_3<80°$, is provided. Also, in step b2, a fourth wall extending at least in the fourth portion at the exit side in a fourth angle $\alpha_4$ with respect to the fourth height, for which applies: $0°<\alpha_4<90°$, or $5°<\alpha_4<85°$ or $10°<\alpha_4<80°$, is provided. Again, the steps may be performed at the same time or in an arbitrary order.

Subsequently, a reflecting layer is applied in step c2 on the third and the fourth inner face. In step d2, the third inner face is arranged opposite to the fourth inner face so that the second depth of the second waveguide sub-segment is defined by a distance between the third and the fourth inner face.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

List of Some Embodiments

1. A first waveguide sub-segment (1) of a negative waveguide (62) for plastic welding, especially for laser transmission welding, comprising:

a. a first wall (10) having a first inner face (12) by means of which laser light can be reflected, b. a second wall (20) having a second inner face (22) by means of which laser light can be reflected, wherein c. the first (12) and the second inner face (22) are arranged opposite to each other and a first depth ($D_1$) of the first waveguide sub-segment (1) is defined by a distance between the first (12) and the second inner face (22), and d. the first (10) and the second wall (20) comprise an exit side (14, 24), which faces the components (T, A) to be welded in operation, and an opposite entry side (16, 26), wherein e. a first height ($H_1$) of the first wall (10) is defined by a distance between the exit (14) and the entry side (16) of the first wall (10) and a second height ($H_2$) of the second wall (20) is defined by a distance between the exit (24) and the entry side (26) of the second wall (20) and f. a first width ($W_1$) of the first wall (10) is defined by an extension of the first wall (10) perpendicular to the first height ($H_1$) as well as to the first depth ($D_1$) and a second width ($W_2$) of the second wall (20) is defined by an extension of the second wall (20) perpendicular to the second height ($H_2$) as well as to the first depth ($D_1$), wherein g. the entry side (16) of the first wall (10) extends at least in a first portion (18) in a first angle $\alpha_1$ with respect to the first height ($H_1$), for which applies: $0°<\alpha_1<90°$, preferably $5°<\alpha_1<85°$ and especially preferred $10°<\alpha_1<80°$, and h. the entry side (26) of the second wall (20) extends at least in a second portion (28) in a second angle $\alpha_1$ with respect to the second height ($H_2$), for which applies: $0°<\alpha_2<90°$, preferably $5°<\alpha_2<85°$ and especially preferred $10°<\alpha_2<80°$, wherein i. during usage of the first waveguide sub-segment (1), laser light from another waveguide sub-segment enters the first waveguide sub-segment (1) between the first (18) and the second portion (28).

2. The first waveguide sub-segment (1) according to embodiment 1, in which the first angle $\alpha_1$ and the second angle $\alpha_2$ are equal.

3. The first waveguide sub-segment (1) according to embodiment 2, in which the first (10) and the second wall (20) are mirror-symmetrical so that the first ($W_1$) and the second width ($W_2$) as well as the first ($H_1$) and the second height ($H_2$) are equal.

4. The first waveguide sub-segment (1) according to embodiment 1 or 2, in which the first height ($H_1$) is different from the second height ($H_2$) and/or the first width ($W_1$) is different from the second width ($W_2$).

5. A second waveguide sub-segment (3) of a negative waveguide (62) for plastic welding, especially for laser transmission welding, comprising:

a. a third wall (30) having a third inner face (32) by means of which laser light can be reflected, b. a fourth wall (40) having a fourth inner face (42) by means of which laser light can be reflected, wherein c. the third (32) and the fourth inner face (42) are arranged opposite to each other and a second depth ($D_2$) of the second waveguide sub-segment (3) is defined by a distance between the third (32) and the fourth inner face (42), and d. the third (30) and the fourth wall (40) comprise an exit side (34, 44), which faces the components (T, A) to be welded in operation, and an opposite entry side (36, 46), wherein e. a third height ($H_3$) of the third wall (30) is defined by a distance between the exit (34) and the entry side (36) of the third wall (30) and a fourth height ($H_4$) of the fourth wall (40) is defined by a distance between the exit (44) and the entry side (46) of the fourth wall (40) and f. a third width ($W_3$) of the third wall (30) is defined by an extension of the third wall (30) perpendicular to the third height ($H_3$) as well as to the second depth ($D_2$) and a fourth width ($W_4$) of the fourth wall (40) is defined by an extension of the fourth wall (40) perpendicular to the fourth height ($H_4$) as well as to the second depth ($D_2$), wherein g. the exit side (34) of the third wall (30) extends at least in a third portion (38) in a third angle $\alpha_3$ with respect to the third height ($H_3$), for which applies: $0°<\alpha_3<90°$, preferably $5°<\alpha_3<85°$ and especially preferred $10°<\alpha_3<80°$, and h. the exit side (44) of the fourth wall (40) extends at least in a fourth portion (48) in a fourth angle $\alpha_4$ with respect to the fourth height ($H_4$), for which applies: $0°<\alpha_4<90°$, preferably $5°<\alpha_4<85°$ and especially preferred $10°<\alpha_4<80°$, wherein i. during usage of the second waveguide sub-segment (3), laser light exits the second waveguide sub-segment (3) between third (38) and fourth portion (40) and enters into a waveguide sub-segment which is arranged successive in radiation direction.

6. The second waveguide sub-segment (3) according to embodiment 5, in which the third angle $\alpha_3$ and the fourth angle $\alpha_4$ are equal.

7. The second waveguide sub-segment (3) according to embodiment 6, in which the third (30) and the fourth wall (40) are mirror-symmetrical so that the third ($W_3$) and the fourth width ($W_4$) as well as the third ($H_3$) and the fourth height ($H_4$) are equal.

8. The second waveguide sub-segment (3) according to embodiment 5 or 6, in which the third height ($H_3$) is different from the fourth height ($H_4$) and/or the third width ($W_3$) is different from the fourth width ($W_4$).

9. A waveguide segment (5) of a negative waveguide (62) for plastic welding, especially for laser transmission welding, comprising:

a. a first waveguide sub-segment (1) according to one of the embodiments 1 to 4 as well as b. a second waveguide sub-segment (3) according to one of the embodiments 5 to 8, wherein c. the first portion (18) faces the third portion (38) and the second portion (28) faces the fourth portion (48), and d. the first (1) and the second waveguide sub-segment (3) are movable relative to each other along at least one axis such that a width ($W_{WS}$) of the waveguide segment (5) is adjustable by varying a distance between the first (1) and the second waveguide sub-segment (3).

10. The waveguide segment (5) according to embodiment 9, which comprises a coupling structure (50) by means of which the waveguide segment (5) is connectable to a tool (60).

11. The waveguide segment (5) according to embodiment 10, which comprises an adjusting structure (52) which is connected at one end to the coupling structure (50) and at a second end to the first (10) and/or third wall (30), especially by means of at least one guiding means (54) for guiding the first (1) and/or second waveguide sub-segment (3) along at least the axis defined by the width ($W_{WS}$) of the waveguide segment (5).

12. The waveguide segment (5) according to one of the embodiments 9 to 11, wherein the first (1) and the second waveguide sub-segment (3) are moveable with respect to each other along the axis defined by the width ($W_{WS}$) of the waveguide segment (5) and/or the distance between the first (1) and the second waveguide sub-segment (3) is between 0 mm and 8 mm, preferably between 0 mm and 5 mm.

13. A tool (60) having a waveguide (62) with a plurality of waveguide segments (64), at least one of which is a waveguide segment (5) according to one of the embodiments 9 to 12.

14. The tool (60) according to embodiment 13, in which further a distance between two adjacent waveguide segments (64, 5) is adjustable, wherein a resulting gap extends parallel to the height ($H_{WS}$) of the waveguide segments (5).

15. The tool (60) according to embodiment 13 or 14, comprising at least two waveguide segments (5) according to one of the claims 9 to 12 which are preferably equally spaced from each other with respect to a total length of the waveguide (62).

16. An arrangement for plastic welding, especially for laser transmission welding, comprising:
  a. a laser light source,
  b. a light guide (7), preferably a plurality of light guides (7), and
  c. a tool (60) according to one of the embodiments 13 to 15, wherein
  d. in operation of the arrangement the laser light passes
    d1. from the laser light source through the light guide (7) and subsequently through the waveguide (62) as well as
    d2. in the waveguide segment (5) according to the embodiments 9 to 12 at least partially from the second waveguide sub-segment (3) into the first waveguide sub-segment (1).

17. A length adjustment method of a negative waveguide (62) of a tool (60) according to one of the embodiments 13 to 15, comprising the steps:
  a. determining a desired length of the waveguide (62) which is required for the welding of two plastic components (T, A) to each other based on the intended welding seam line,
  b. comparing the determined desired length with an actual length of the waveguide (62), and
  c. adjusting the actual length of the waveguide (62) to the desired length by means of varying the distance between the first (1) and the second waveguide sub-segment (3).

18. A method for plastic welding, especially for laser transmission welding, with an arrangement according to embodiment 16, comprising the following steps:
  a. arranging two plastic components (T, A) to be welded to each other in a mounting device,
  b. creating laser light by means of a laser light source, wherein the laser light passes through a light guide (7), preferably a plurality of light guides (7), and subsequently through a waveguide (62) of a tool (60) according to one of the embodiments 13 to 15, and
  c. welding the plastic components (T, A) to be welded to each other by means of the laser light exiting the waveguide (62).

19. A manufacturing method of a first waveguide sub-segment (1) according to embodiments 1 to 4 and/or of a second waveguide sub-segment (3) according to one of the embodiments 5 to 8, comprising the steps:
  a1. providing a first wall (10) extending at least in the first portion (18) at the entry side (16) in the first angle $\alpha_1$ with respect to the first height ($H_1$), for which applies: $0°<\alpha_1<90°$, preferably $5°<\alpha_1<85°$ and especially preferred $10°<\alpha_1<80°$, and
  b1. providing a second wall (20) extending at least in the second portion (28) at the entry side (26) in a second angle $\alpha_2$ with respect to the second height ($H_2$), for which applies: $0°<\alpha_2<90°$, preferably $5°<\alpha_2<85°$ and especially preferred $10°<\alpha_2<80°$,
  c1. applying a reflecting layer on the first (12) and the second inner face (22), and
  d1. arranging the first inner face (12) opposite to the second inner face (22) so that the first depth ($D_1$) of the first waveguide sub-segment (1) is defined by a distance between the first (12) and the second inner face (22),
  and/or the method comprises
  a2. providing a third wall (30) extending at least in the third portion (38) at the exit side (34) in the third angle $\alpha_3$ with respect to the third height ($H_3$), for which applies: $0°<\alpha_3<90°$, preferably $5°<\alpha_3<85°$ and especially preferred $10°<\alpha_3<80°$, and
  b2. providing a fourth wall (40) extending at least in the fourth portion (48) at the exit side (44) in a fourth angle $\alpha_4$ with respect to the fourth height ($H_4$), for which applies: $0°<\alpha_4<90°$, preferably $5°<\alpha_4<85°$ and especially preferred $10°<\alpha_4<80°$,
  c2. applying a reflecting layer on the third (32) and the fourth inner face (42), and
  d2. arranging the third inner face (32) opposite to the fourth inner face (42) so that the second depth ($D_2$) of the second waveguide sub-segment (3) is defined by a distance between the third (32) and the fourth inner face (42).

The invention claimed is:

1. A first waveguide sub-segment of a negative waveguide for plastic welding, especially for laser transmission welding, comprising:
  a. a first wall having a first inner face by means of which laser light can be reflected,
  b. a second wall having a second inner face by means of which laser light can be reflected, wherein
  c. the first and the second inner face are arranged opposite to each other and a first depth of the first waveguide sub-segment is defined by a distance between the first and the second inner face, and
  d. the first and the second wall comprise an exit side, which faces the components to be welded in operation, and an opposite entry side, wherein
  e. a first height of the first wall is defined by a distance between the exit and the entry side of the first wall and a second height of the second wall is defined by a distance between the exit and the entry side of the second wall and
  f. a first width of the first wall is defined by an extension of the first wall perpendicular to the first height as well as to the first depth and a second width of the second wall is defined by an extension of the second wall perpendicular to the second height as well as to the first depth, wherein
  g. the entry side of the first wall extends at least in a first portion in a first angle $\alpha_1$ with respect to the first height, for which applies: $0°<\alpha_1<90°$, and
  h. the entry side of the second wall extends at least in a second portion in a second angle $\alpha_2$ with respect to the second height, for which applies: $0°<\alpha_2<90°$, wherein
  i. during usage of the first waveguide sub-segment, laser light from another waveguide sub-segment enters the first waveguide sub-segment between the first and the second portion.

2. The first waveguide sub-segment according to claim 1, in which the first angle $\alpha_1$ and the second angle $\alpha_2$ are equal.

3. The first waveguide sub-segment according to claim 2, in which the first and the second wall are mirror-symmetrical so that the first and the second width as well as the first and the second height are equal.

4. The first waveguide sub-segment according to claim 1, in which the first height is different from the second height and/or the first width is different from the second width.

5. A second waveguide sub-segment of a negative waveguide for plastic welding, especially for laser transmission welding, comprising:
  a. a third wall having a third inner face by means of which laser light can be reflected,
  b. a fourth wall having a fourth inner face by means of which laser light can be reflected, wherein c. the third and the fourth inner face are arranged opposite to each other and a second depth of the second waveguide sub-segment is defined by a distance between the third and the fourth inner face, and d. the third and the fourth wall comprise an exit side, which faces the components to be welded in operation, and an opposite entry side, wherein e. a third height of the third wall is defined by a distance between the exit and the entry side of the third wall and a fourth height of the fourth wall is defined by a distance between the exit and the entry side of the fourth wall and f. a third width of the third wall is defined by an extension of the third wall perpendicular to the third height as well as to the second depth and a fourth width of the fourth wall is defined by an extension of the fourth wall perpendicular to the fourth height as well as to the second depth, wherein g. the exit side of the third wall extends at least in a third portion in a third angle $\alpha_3$ with respect to the third height, for which applies: $0°<\alpha_3<90°$, and h. the exit side of the fourth wall extends at least in a fourth portion in a fourth angle $\alpha_4$ with respect to the fourth height, for which applies: $0°<\alpha_4<90°$, wherein i. during usage of the second waveguide sub-segment, laser light exits the second waveguide sub-segment between third and fourth portion and enters into a waveguide sub-segment which is arranged successive in radiation direction.

6. The second waveguide sub-segment according to claim 5, in which the third angle $\alpha_3$ and the fourth angle $\alpha_4$ are equal.

7. The second waveguide sub-segment according to claim 6, in which the third and the fourth wall are mirror-symmetrical so that the third and the fourth width as well as the third and the fourth height are equal.

8. The second waveguide sub-segment according to claim 5, in which the third height is different from the fourth height and/or the third width is different from the fourth width.

9. A waveguide segment of a negative waveguide for plastic welding, especially for laser transmission welding, comprising:
   a. a first waveguide sub-segment according to claim 1 as well as
   b. a second waveguide sub-segment according to claim 5, wherein
   c. the first portion faces the third portion and the second portion faces the fourth portion, and
   d. the first and the second waveguide sub-segment are movable relative to each other along at least one axis such that a width of the waveguide segment is adjustable by varying a distance between the first and the second waveguide sub-segment.

10. The waveguide segment according to claim 9, which comprises a coupling structure by means of which the waveguide segment is connectable to a tool.

11. The waveguide segment according to claim 10, which comprises an adjusting structure which is connected at one end to the coupling structure and at a second end to the first and/or third wall, especially by means of at least one guiding means for guiding the first and/or second waveguide sub-segment along at least the axis defined by the width of the waveguide segment.

12. The waveguide segment according to claim 9, wherein the first and the second waveguide sub-segment are moveable with respect to each other along the axis defined by the width of the waveguide segment and/or the distance between the first and the second waveguide sub-segment is between 0 mm and 8 mm.

13. An arrangement for plastic welding, especially for laser transmission welding, comprising:
   a. a laser light source,
   b. a light guide, and
   c. a tool having a waveguide with a plurality of waveguide segments, at least one of which is a waveguide segment according to claim 9, wherein
   d. in operation of the arrangement the laser light passes
      d1. from the laser light source through the light guide and subsequently through the waveguide as well as
      d2. in the waveguide segment according to claim 9 at least partially from the second waveguide sub-segment into the first waveguide sub-segment.

14. The arrangement according to claim 13, in which further a distance between two adjacent waveguide segments is adjustable, wherein a resulting gap extends parallel to the height of the waveguide segments.

15. The arrangement according to claim 13, comprising at least two waveguide segments according to claim 9 which are spaced from each other with respect to a total length of the waveguide.

16. A manufacturing method of a first waveguide sub-segment according to claim 1 and/or of a second waveguide sub-segment according to claim 5, comprising the steps:
   a1. providing a first wall extending at least in the first portion at the entry side in the first angle $\alpha_1$ with respect to the first height, for which applies: $0°<\alpha_1<90°$, and
   b1. providing a second wall extending at least in the second portion at the entry side in a second angle $\alpha_2$ with respect to the second height, for which applies: $0°<\alpha_2<90°$,
   c1. applying a reflecting layer on the first and the second inner face, and
   d1. arranging the first inner face opposite to the second inner face so that the first depth of the first waveguide sub-segment is defined by a distance between the first and the second inner face,
   and/or the method comprises
   a2. providing a third wall extending at least in the third portion at the exit side in the third angle $\alpha_3$ with respect to the third height, for which applies: $0°<\alpha_3<90°$, and
   b2. providing a fourth wall extending at least in the fourth portion at the exit side in a fourth angle $\alpha_4$ with respect to the fourth height, for which applies: $0°<\alpha_4<90°$,
   c2. applying a reflecting layer on the third and the fourth inner face, and
   d2. arranging the third inner face opposite to the fourth inner face so that the second depth of the second waveguide sub-segment is defined by a distance between the third and the fourth inner face.

* * * * *